United States Patent [19]

Blake et al.

[11] Patent Number: 4,563,740

[45] Date of Patent: Jan. 7, 1986

[54] METHOD AND MEANS FOR AUTOMATICALLY VARIABLY CONTROLLING DISPLAY PARAMETERS

[75] Inventors: James E. Blake, New Berlin; James D. Hajicek, Burlington, both of Wis.

[73] Assignee: General Electric Company, Milwaukee, Wis.

[21] Appl. No.: 552,664

[22] Filed: Nov. 17, 1983

[51] Int. Cl.$^4$ ............................................. H03K 29/00
[52] U.S. Cl. ..................................... 364/414; 364/190; 364/484; 328/18; 340/709
[58] Field of Search ............... 364/414, 190, 484, 701, 364/703; 340/709, 710, 703, 729, 749, 731; 74/471 XY; 328/18, 17; 307/271

[56] References Cited

U.S. PATENT DOCUMENTS

| | | | |
|---|---|---|---|
| 3,355,539 | 11/1967 | Munch et al. | 328/18 |
| 3,541,521 | 11/1970 | Koster | 340/710 |
| 3,729,129 | 4/1973 | Fletcher et al. | 364/190 |
| 4,122,518 | 10/1978 | Castleman et al. | 364/190 |
| 4,223,257 | 9/1980 | Miller | 364/190 |
| 4,259,725 | 3/1981 | Andrews et al. | 340/709 X |
| 4,318,045 | 3/1982 | Krupa et al. | 328/18 |
| 4,454,507 | 6/1984 | Srinivasan et al. | 340/709 X |
| 4,493,992 | 1/1985 | Geller | 340/709 X |
| 4,521,843 | 6/1985 | Pezzolo et al. | 364/145 |

OTHER PUBLICATIONS

*The Art of Electronics:* Paul Horowitz et al., Cambridge U. Press, 1980.

Primary Examiner—Jerry Smith
Assistant Examiner—Allen MacDonald
Attorney, Agent, or Firm—Flehr, Hohbach, Test, Albritton & Herbert

[57] ABSTRACT

The display Gray level in a video display of a computer tomography system is changed at a rate which is non-linearly proportional to the rate of pulses generated by a manually operated control such as a track ball thereby accelerating change in the Gray level when a large change is desired and decelerating change in the Gray level when exact positioning is desired. Control of the rate of change can be by programmed computer or by hardwired logic.

4 Claims, 9 Drawing Figures

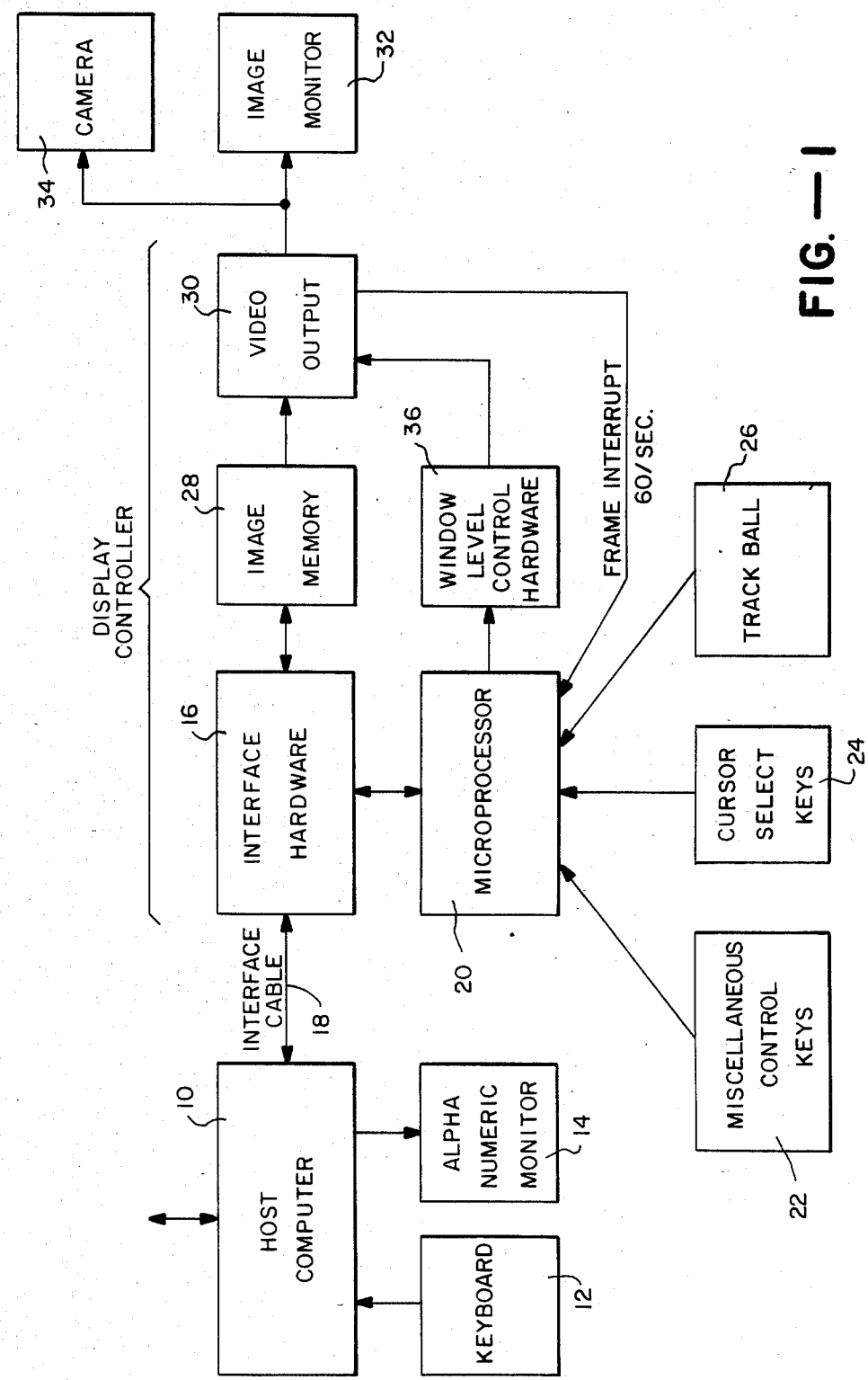
FIG.—1

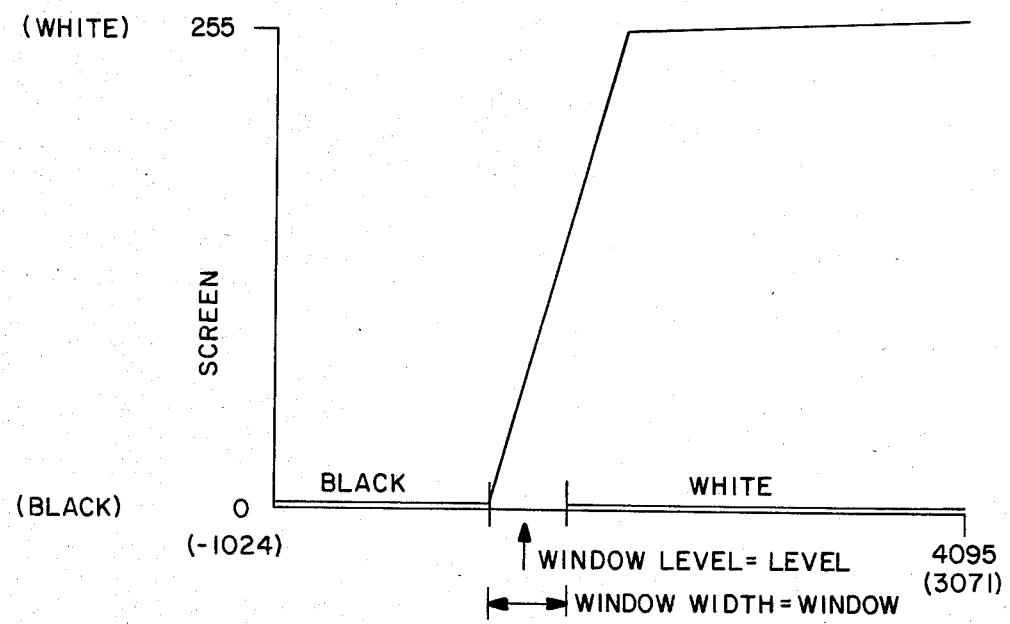
FIG. — 2
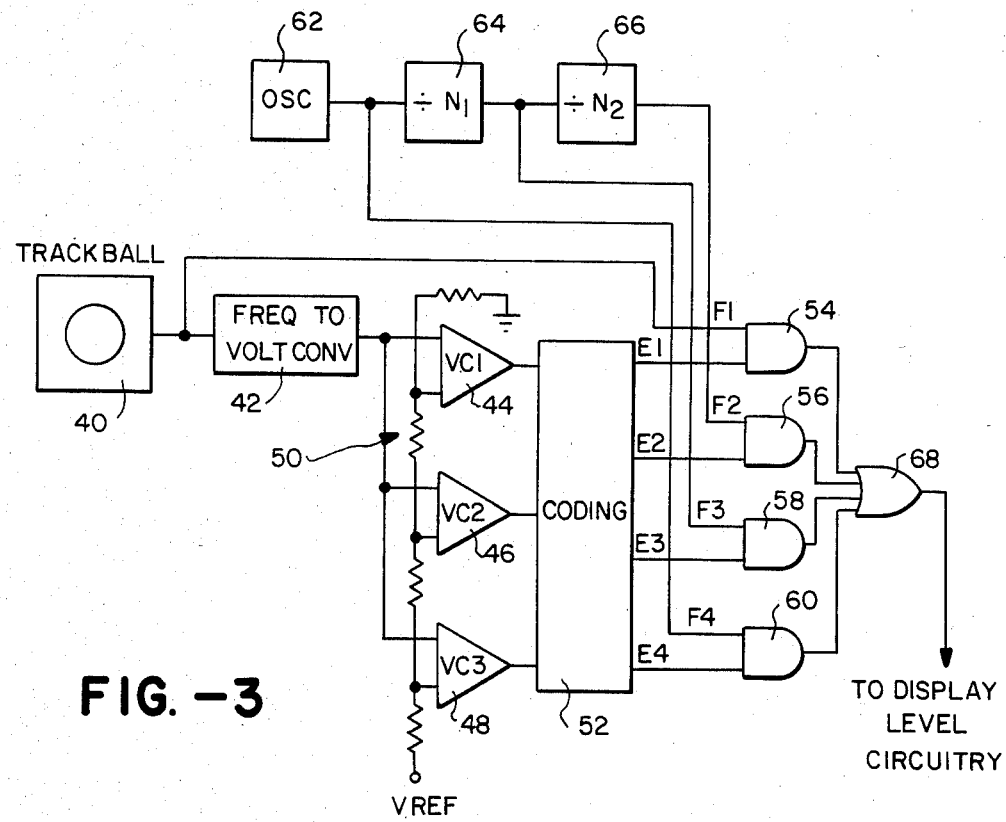
FIG. —3

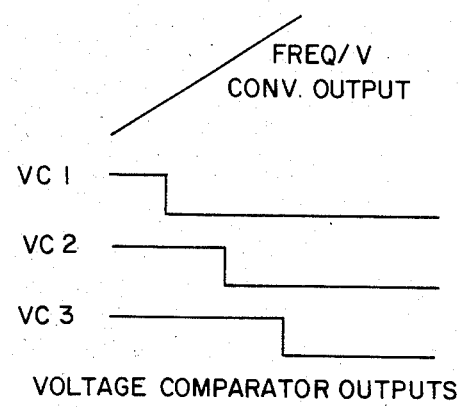
FIG. —4A
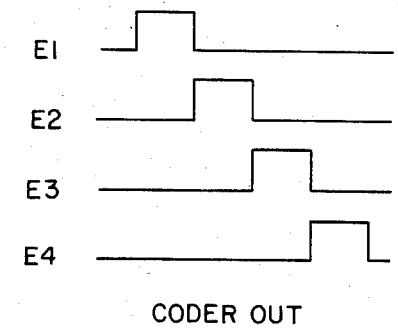
FIG. —4B
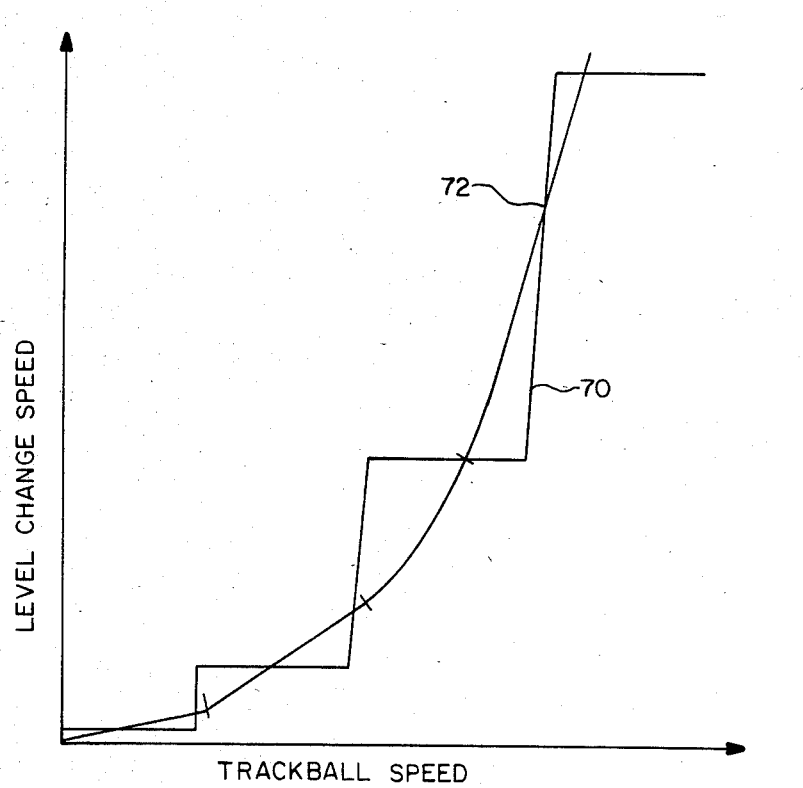
FIG. — 5

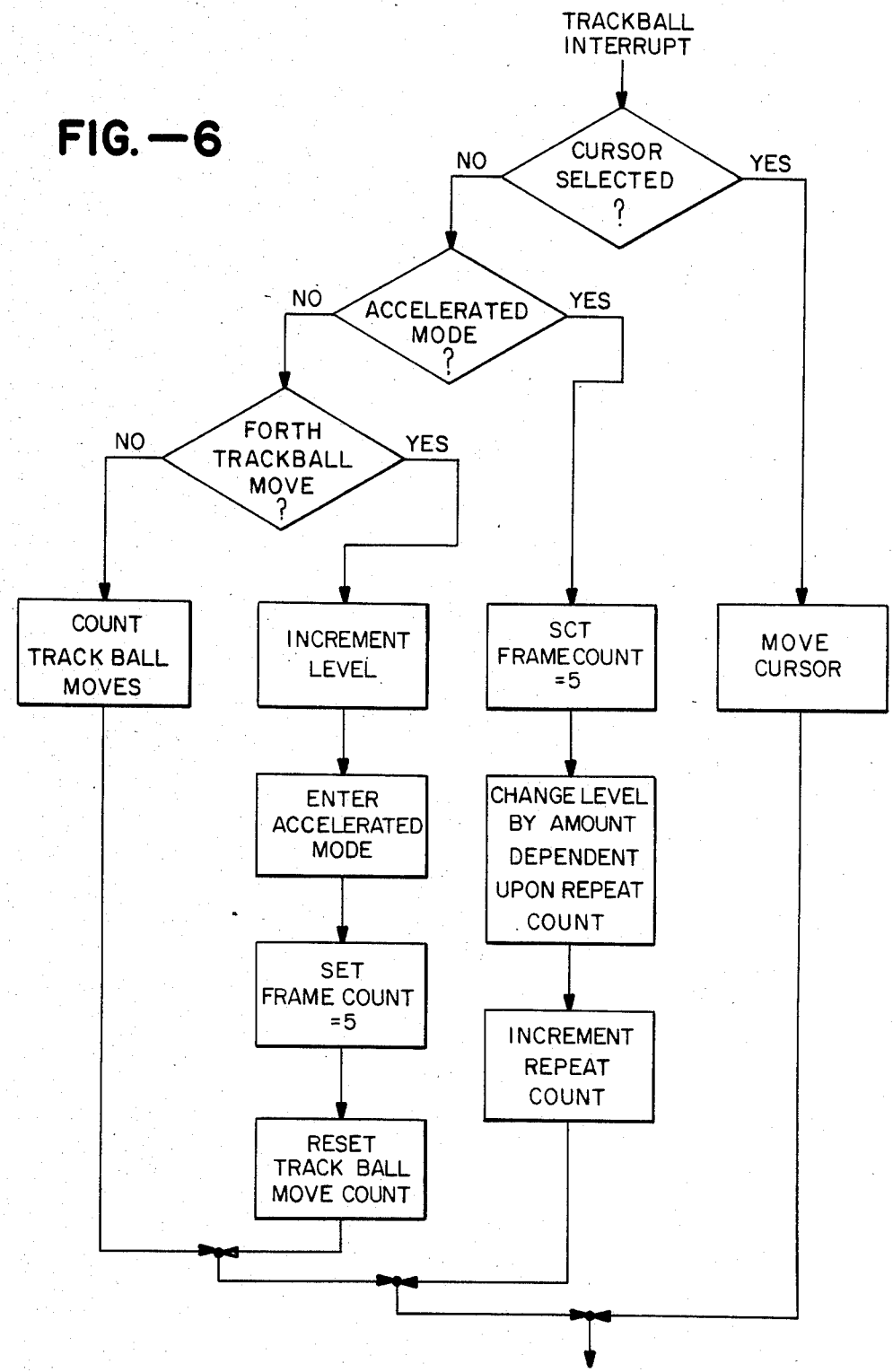
FIG.—6

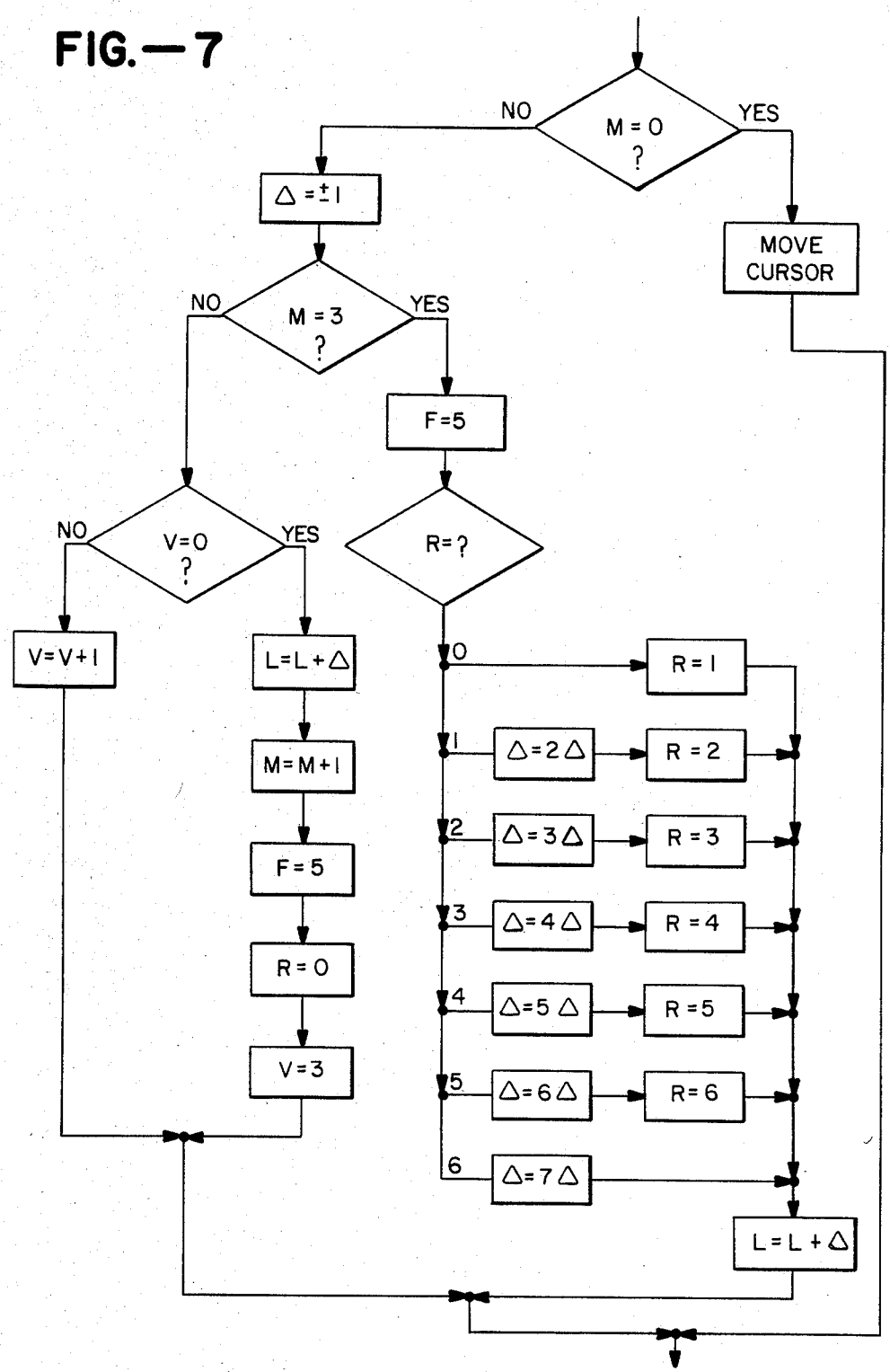
FIG.—7

METHOD AND MEANS FOR AUTOMATICALLY VARIABLY CONTROLLING DISPLAY PARAMETERS

This invention relates generally to the control of video display parameters and the like, and more particularly the invention relates to a method and means for automatically variably controlling display parameters to achieve rapid and smooth transitions with precision from one parameter value to another parameter value.

In computed tomography, cross sectional images are formed based on the reconstruction of data from the attenuation of waves, typically x-rays, passing through a body along a plurality of paths. The attenuation of the waves is expressed in CT values which can vary from 0 to 4095 in the General Electric 9800-CT system. CT numbers are proportional to the x-ray attenuation by small volume elements in the body being scanned with the x-ray beam.

The CT values are displayed on a cathode ray tube as levels of gray. However, the conventional video display is capable of displaying only about 265 gray levels between a black level and a white level. Accordingly, it has been the practice to select from a large range of CT values a limited range called a window and to display picture elements having CT values within the window over the gray scale capability of the CRT. CT values above the upper window limit are white and those below the lower window limit are black.

See, for example, U.S. Pat. No. 4,105,922 for "CT Number Identifier In A Computed Tomography System."

An operator control called LEVEL is provided in a CT display system to establish the center of a selected window of CT values to be displayed on the image monitor. This will then cause pixel values equal to the level setting to be displayed as middle Gray while CT values greater than the upper limit of the window are displayed as white pixels and CT values less than the lower limit are displayed as black pixels. Intermediate CT values are then displayed as various shades of gray depending upon their relative position within the selected window.

The manually operated level control must have sufficient range of speed for a desired value to be quickly reached with a minimum of effort. Heretofore, two speed rocker switches or a rotary knob have been provided for handling the level control adjustment. However, with the increased contrast range capability in the GE 9800 CT system, for example, excessive manual operation is needed to vary the display window over the full range of CT numbers.

Accordingly, an object of the present invention is a method of varying the rate of change of a parameter to achieve rapid and exact changes.

Another object of the invention is apparatus for varying the rate of change of a parameter in response to a manually operated control.

A feature of the invention in accordance with one embodiment is apparatus responsive to the duration of change of a parameter for automatically varying the rate of change of the parameter.

Another feature of the invention in accordance with another embodiment is logic coding means for non-linearly varying the rate of change of a parameter based on rate of change of a manually operated control.

The invention and objects and features thereof will be more readily apparent from the following detailed description and appended claims when taken with the drawing, in which:

FIG. 1 is a functional block diagram of a computerized tomography system.

FIG. 2 is a plot illustrating the display of data expressed in CT numbers by a CRT display having a limited number of gray display levels.

FIG. 3 is a functional block diagram of logic circuitry for varying the rate of change of a display window level of a cathode ray tube display in accordance with one embodiment of the invention.

FIGS. 4A and 4B are plots illustrating voltage comparator outputs and coder outputs in the circuitry of FIG. 3.

FIG. 5 is a plot illustrating the non-linear response of window level movement to track ball movement in FIG. 3.

FIG. 6 is a flow diagram of a computer program responsive to manually operated track ball movement.

FIG. 7 is a flow diagram of a computer program for non-linearly varying window and level.

Figure 8:
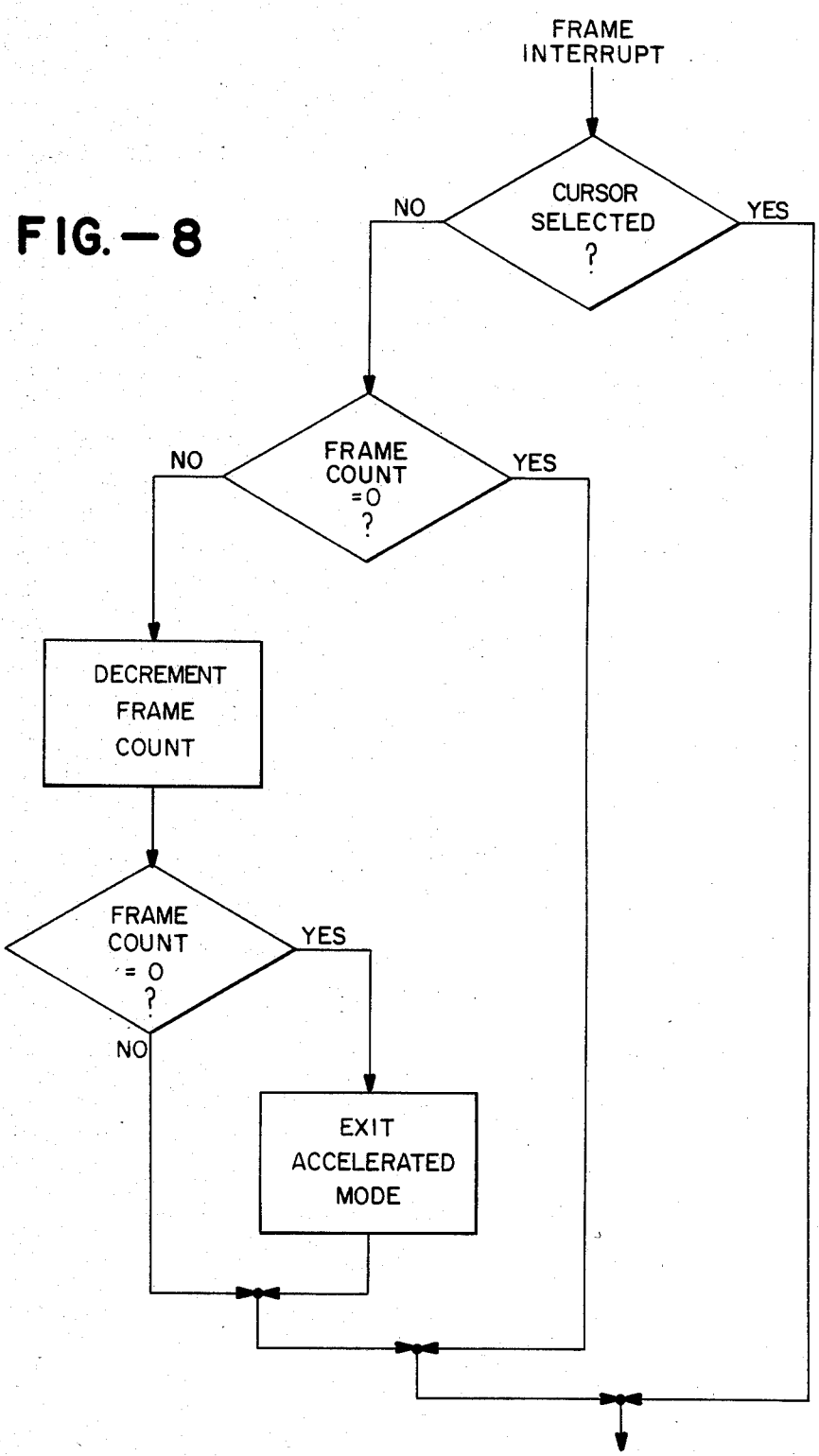
FIG. 8 is a flow diagram of a computer program for frame interrupt in a program implemented control system.

Referring now to the drawings, FIG. 1 is a functional block diagram of a portion of a CRT display apparatus for use with a CT system. The CT system (not shown), including patient table, radiation source, and detectors is controlled by a host computer 10 which typically has a keyboard 12 and an alphanumeric monitor 14 associated therewith. Data from the host computer 10 is interconnected to interface hardware 16 of the display controller through an interface cable 18. The interface hardware operates under control of a microprocessor 20 which has associated therewith miscellaneous control keys 22, cursor select key 24, and a manually operated control such as a track ball 26 for movement of the cursor. Data from the interface hardware 16 is stored in an image memory 28 from which it is passed through a video output 30 to the CRT image monitor 32. A camera 34 can be provided with the output for recording the displayed image.

Associated with the video output 30 under control of microprocessor 20 is the window level control hardware 36. As noted above, the window level control hardware has heretofore included manually operated rocker switches or a rotary knob for providing the window level control adjustment. As above noted, such manually operated controls are not feasible for use with a CT system having a large range of CT values for the level control.

FIG. 2 is a plot of CT values versus screen grey levels which illustrates the displayed window portion of the CT data. The window has a limited width for the displayed CT data, and the center of the window or the intermediate level of the displayed CT data, designated the window level, is movable to vary the CT numbers displayed.

In accordance with the present invention control apparatus in either hardware or firmware is provided for varying the speed of level change in response to a manually operated control. In a preferred embodiment, the track ball used for a cursor control can be used for level control, also. Depending on rate and continuity of track ball operation, the rate of level change will be automatically increased for rapidly effecting a level change and will be automatically decreased to establish an exact level for CT number display.

As is well known, the track ball is the equivalent of an electronic joy stick and comprises a smooth ball which is supported for revolving in all directions in a socket in a control console. A hemisphere of the ball is exposed so that an operator may rotate the ball by finger touch and watch a line or outline develop on the display screen. The concealed hemisphere of the ball rests on at least a pair of rollers which drive encoders. The encoders produce trains of electric pulses when the ball is turned.

FIG. 3 is a functional block diagram of logic hardware for variably controlling the level of the CRT display in accordance with one embodiment of the invention. As above described, rotation of track ball 40 generates a train of pulses the frequency of which depends on rotation speed of the track ball. The pulse train is applied to a frequency to voltage converter 42 which provides a DC output voltage proportional to the frequency of the pulse train input. The output voltage from the converter 42 is then applied to a plurality of voltage comparators 44, 46, and 48. One input of each of the voltage comparators is connected to a resistive voltage divider shown generally at 50 which is connected between a reference voltage, $V_{ref}$, and circuit ground. Each of the voltage comparators provides an output voltage depending on the comparison of the reference voltage from the voltage divider 50 and the voltage from converter 42. The output voltage from the voltage converter 42 and the outputs from the voltage comparators 44–48 are illustrated in FIG. 4A. The output signal from each of the comparators has a transition when the voltage from converter 42 exceeds the reference voltage applied to the comparator. Thus, the output of comparator 44 has the initial transition since its reference voltage is lowest, whereas the output from comparator 48 occurs later since it has the largest reference voltage applied thereto. The outputs from voltage comparators 44–48 are applied to coding circuitry 52 which generates four outputs E1–E4, as illustrated in FIG. 4B.

Each of the outputs E1–E4 is applied to one input of the AND gates 54, 56, 58, and 60. The other input to AND gate 54 is the pulse train from the output of track ball 40, the other input to AND gate 56 is derived by dividing the output of an oscillator 62 by dividers 64 and 66, the other input to AND gate 58 is derived by dividing the output of oscillator 62 by divider 64, and the other input to AND gate 60 is derived directly from the output of oscillator 62. Thus, AND gate 54 will produce an output only when the track ball 40 is moving an minimal speed, whereupon the slow pulse train from track ball 40 is applied at the output of AND gate 54. Conversely, when the track ball 40 is moved rapidly by the operator, thereby generating a rapid pulse train, AND gate 60 will provide an output derived directly from the high frequency oscillator 62. Similarly, AND gates 56 and 58 provide intermediate frequencies derived from the dividers 64 and 66, as described, for intermediate frequencies of the pulse train at the output of track ball 40. The outputs from the AND gates 54-60 are applied to OR gate 68 which in turn provides a pulse train to the window level circuitry for level adjustment.

Thus, it is seen that the apparatus non-linearly responds to the movement of track ball 40 to accelerate changes in window level or to more slowly establish an exact level. The operator can accelerate change of the display level by rapid movement of the track ball 40, and a slower movement for exact level setting is obtained by moving the track ball 40 slowly. FIG. 5 is a plot of the track ball speed versus level change speed. The curve 70 illustrates the four different pulse rates or speeds which can be obtained using the circuitry of FIG. 3. Curve 72 is a smoother curve which can be realized by using additional voltage comparators and pulse rates.

The invention can be implemented by computer program, also. FIGS. 6 and 7 are flow diagrams of portions of a computer program for implementing the invention. In the flow diagrams the following nomenclature is employed:

M: Track ball mode
0: Normal track ball controls the cursor
1: Track ball controls LEVEL, standby
2: Track ball controls LEVEL, standby
3: Trackball controls LEVEL, accelerated rate determined by variable R.
Δ is LEVEL delta
Δ=1 for upward track ball motion
Δ=−1 for downward track ball motion
V is value count, used in slow mode (M=1,2) to divide track ball pulses by four, changing the level only every forth pulse.
F is frame count, used to reset track ball mode back to slow speed after five frames with no track ball motion.
R is repeat count, in accelerated mode (M3). This records number of times a track ball movement has occurred in one frame period (1/60 sec.) or other selected time period.

In accordance with this embodiment the track ball has four modes, the first mode being for controlling the cursor of the display and the other three modes being for controlling the level change rate. Mode 3, M3, is an accelerated rate change with the rate being determined by a variable, R, which represents the number of pulses generated by the track ball in one frame period of the CRT (1/60 second). In modes M1 and M2 the pulse output from the track ball is divided by four and applied to control the level.

The symbol delta, Δ, has a value of +1 for upward track movement (e.g. increased level), and a value of −1 for downward track motion (e.g. decreased level).

V is the value count used in the modes 1 and 2 to divide the track ball generated pulses and thereby reduce the change of level speed.

F is the frame count used to reset the track ball mode to a slow speed after five consecutive frames with no track ball motion.

FIG. 6 is a flow diagram for the track ball interrupt program. First, the mode M for the track ball is determined, and if the mode equals zero then the track ball merely moves the cursor. If the mode does not equal zero, then the accelerated mode is identified if M equal 3. If in the accelerated mode then frame count is set to 5, the level is non-linearly changed by an amount dependent upon the repeat count (R), and the repeat count is incremented, as will be described with respect to FIG. 7.

If the track ball is not in the accelerated mode, then the level is incremented if the fourth track ball pulse is identified (e.g. pulse output is divided by four). The accelerated mode is entered if the stored count R from the preceding frame exceeds a predetermined threshold level and thereupon the frame count is set to 5. The track ball move count is reset.

If the mode is M1 or M2 and the track ball count is not four, then the number of track ball moves is counted and stored.

FIG. 7 is a flow diagram of the program for non-linearly varying display window and level, similar in function to the hardware of FIG. 3. If M=0, then the trackball controls the cursor. If M is not equal to 0, then direction of movement, Δ, is determined and then a determination is made of acceleration mode (M=3). If in the acceleration mode, then frame count, F, is set to 5 and then level adjustment is established based on the value of R, the number of trackball movements in the preceding frame time period.

If not in the acceleration mode (M=3), then the value count, V, is decremented if not zero. If V is zero, then the level, L, is incremented, the mode, M, is incremented, frame count is set to 5, R is set to zero indicating the trackball movement, and the value, V, is set to 3 for subsequent decrementing to achieve a one-fourth reduction in count of trackball pulses.

FIG. 8 is the flow diagram for the program used in exiting the accelerated mode. Again, the track ball mode is determined and if zero then the cursor is being controlled. If the frame count is not zero then the frame count is decremented and if then equal to zero the accelerated mode is exited because no change has occurred in the previous five frames. Thus, the accelerated mode (M3) is entered when track ball movement in one frame exceeds a set level, and acceleration mode is exited when no movement occurs in five consecutive frames.

The automatic, variable control of parameters using either hardware or software in accordance with the invention permits rapid and smooth transitions as well as exact selection of new parameters. While the invention has been described with reference to the control of a CRT display (window and level) in a computed tomography system and in a hardware embodiment and in a software embodiment, the description is illustrative of the invention and is not to be construed as limiting the invention. Various applications and modifications may occur to those skilled in the art without departing from the true spirit and scope of the invention as defined by the appended claims.

What is claimed is:

1. For use in controlling the Gray scale level of a video display and the display window of CT numbers in a computed tomography system, apparatus for automatically and variably generating a pulse train comprising manually operated pulse generation means for generating a first pulse train, means for receiving said pulse train and responsive to the frequency thereof for generating a second pulse train, the frequency of said second pulse train being nonlinearly proportional to the frequency of said first pulse train, said means for receiving including an oscillator and a plurality of frequency dividers connected with said oscillator for producing pulses at a plurality of pulse rates, and logic means for selecting a pulse rate depending on said frequency of said first pulse train, said logic means including a frequency to voltage converter connected to receive said first pulse train and generate a voltage in response thereto, a plurality of voltage comparators for receiving and comparing said voltage and a plurality of reference voltages and generating logic signals in response thereto, and logic gate means operably connected to receive said logic signals and in response thereto selecting a pulse rate.

2. Apparatus as defined by claim 1 wherein said logic means selects a pulse rate from one of said plurality of pulse rates and from said frequency of said first pulse train.

3. Apparatus as defined by claim 1 wherein said logic gate means is operably connected to receive pulse trains at said plurality of pulse rates.

4. For use in controlling the Gray scale level of a video display and the display window of CT numbers in a computed tomography system, apparatus for automatically and variably generating a pulse train for controlling a parameter comprising manually operated pulse generation means for generating a first pulse train, means for receiving said pulse train and responsive to the frequency thereof for generating a second pulse train, the frequency of said second pulse train being nonlinearly proportional to the frequency of said first pulse train, said means for receiving including computer means programmed to respond to said frequency of said first pulse train and selecting said frequency of said second pulse train, said computer means establishing an accelerated mode after a first period of time of said first pulse train, said accelerated mode determining said frequency of said second pulse train in response to said frequency of said first pulse train.

* * * * *